(12) United States Patent
Rainisto

(10) Patent No.: US 7,932,895 B2
(45) Date of Patent: Apr. 26, 2011

(54) CONTROL OF AN ELECTRONIC DEVICE USING A GESTURE AS AN INPUT

(75) Inventor: Roope Rainisto, Helsinki (FI)

(73) Assignee: Nokia Corporation, Espoo (FI)

( * ) Notice: Subject to any disclaimer, the term of this patent is extended or adjusted under 35 U.S.C. 154(b) by 1250 days.

(21) Appl. No.: 11/137,093

(22) Filed: May 24, 2005

(65) Prior Publication Data

US 2006/0267951 A1    Nov. 30, 2006

(51) Int. Cl.
G06F 3/041    (2006.01)

(52) U.S. Cl. .................................. 345/173; 382/189

(58) Field of Classification Search ............ 178/18.01, 178/19.01; 345/104, 156, 168, 173, 179, 345/180, 182, 349, 467, 469, 471, 472, 700; 273/237; 364/200; 341/22; 382/187, 189, 382/192, 198; 715/268
See application file for complete search history.

(56) References Cited

U.S. PATENT DOCUMENTS

| | | | | |
|---|---|---|---|---|
| 5,594,810 A * | 1/1997 | Gourdol | ........................ | 382/187 |
| 5,864,635 A * | 1/1999 | Zetts et al. | .................... | 382/187 |
| 6,188,789 B1 * | 2/2001 | Marianetti et al. | ............ | 382/189 |
| 6,661,409 B2 * | 12/2003 | Demartines et al. | .......... | 345/173 |
| 6,721,452 B2 * | 4/2004 | Confer et al. | ................. | 382/197 |
| 6,938,220 B1 * | 8/2005 | Shigematsu et al. | .......... | 715/863 |
| 7,280,695 B2 * | 10/2007 | Leung et al. | .................. | 382/187 |
| 2001/0035860 A1 * | 11/2001 | Segal et al. | ................... | 345/173 |
| 2002/0041271 A1 * | 4/2002 | LeKuch et al. | ............... | 345/173 |
| 2003/0107558 A1 * | 6/2003 | Bryborn et al. | ............... | 345/179 |
| 2004/0070573 A1 * | 4/2004 | Graham | ........................ | 345/179 |
| 2004/0239639 A1 * | 12/2004 | Stavely et al. | ................ | 345/173 |
| 2005/0152601 A1 * | 7/2005 | Chen et al. | .................... | 382/187 |
| 2005/0180633 A1 * | 8/2005 | Williamson et al. | .......... | 382/187 |

* cited by examiner

Primary Examiner — Chanh Nguyen
Assistant Examiner — Pegeman Karimi
(74) Attorney, Agent, or Firm — Harrington & Smith

(57) ABSTRACT

A method of controlling an electronic device using a gesture as an input, including recording a gesture and detecting, within the gesture, each one of a sequence of partial gestures that form the gesture; and performing the same first command on detecting each partial gesture.

29 Claims, 3 Drawing Sheets

CONTROL OF AN ELECTRONIC DEVICE USING A GESTURE AS AN INPUT

FIELD OF THE INVENTION

Embodiments of the present invention relate to controlling an electronic device using a gesture as an input.

BACKGROUND TO THE INVENTION

Electronic devices with touch screen input devices generally provide either a virtual keyboard or handwriting recognition as a text input method. A virtual keyboard presents a layout of virtual keys similar to physical keyboards on the touch screen. The user can tap individual virtual keys to input characters and access functions. Handwriting recognition requires that the user draws characters on the touch screen, often with a stylus. The system then tries to recognise the user input and convert it into a character. The recognition systems typically work by comparing the user drawn input to a library of character patterns and mathematically calculating the best pattern recognition value for that input.

With these text input methods additional functions can be provided by defining specific a drawing pattern for each function Traditionally the backspace (delete) function is provided to the user by presenting a backspace key in the user interface.

With handwriting recognition, this backspace key has to be in a separate area than the handwriting recognition area. Therefore pressing this backspace key breaks the user's focus from inputting characters. Moving the stylus to the key takes time, and the general mental switch from drawing patterns to tapping buttons takes also some mental effort.

This is why some handwriting recognition systems also allow backspace entering with a gesture. Generally the gesture is a simple pen stroke from right to left. After lifting up the pen the system then recognizes the drawn stroke as a gesture and deletes the last recognized character.

With a virtual keyboard, the backspace key is generally presented in a manner similar to physical keyboards, i.e. as a separate key in the keyboard. The same problem is present in this button as with handwriting recognition, although to a lesser extent, since it is also tapped like the character buttons.

When inputting text the preservation of user focus is critical in establishing high input speeds and user satisfaction. The key task is the correct input of characters, either via a virtual keyboard or by handwriting recognition. Accessing additional relevant functions should be made simple and intuitive.

A problem relating to the backspace function is that in many cases the user is required to input more than one backspace. While tapping the backspace button multiple times is relatively simple, drawing the backspace gesture multiple times (lowering the pen, drawing the gesture, lifting the pen up, moving the pen back, drawing the gesture again etc.) is complicated.

It would therefore be desirable to improve the control of an electronic device using a gesture as a control input.

BRIEF DESCRIPTION OF THE INVENTION

According to one embodiment of the invention there is provided a method of controlling an electronic device using a gesture as an input, comprising: recording a gesture and detecting, within the gesture, each one of a sequence of partial gestures that form the gesture; and performing the same first command on detecting each partial gesture.

According to another embodiment of the invention there is provided an electronic device that is controllable by gesture comprising: a gesture input device for detecting a gesture; a memory for recording at least portions of the detected gesture; a detector for detecting, within the gesture, each one of a sequence of partial gestures that form the gesture; and a controller for performing the same first command on detecting each partial gesture.

According to a further embodiment of the invention there is provided a storage device embodying a computer program comprising program instructions which when loaded into a processor provide for means for detecting each one of a sequence of partial gestures that form the gesture; and means for performing the same first command on detecting each partial gesture.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
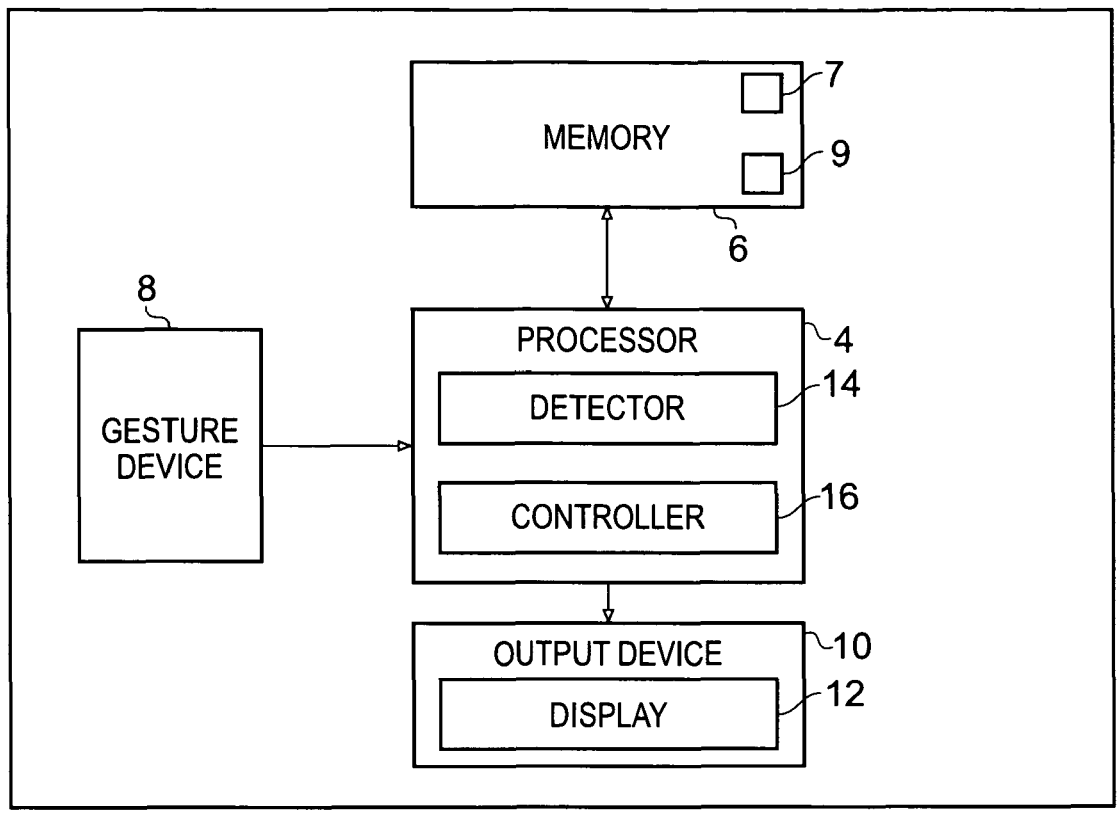
FIG. 1 schematically illustrates an electronic device 2 that is controllable by gesture.

FIG. 1 schematically illustrates an electronic device 2 that is controllable by gesture. The device 2 comprises: a processor 4, a memory 6, a gesture input device 8 and an output device 10.

The processor 4 is connected to read from and write to the memory 6. It receives input from the gesture input device 8 and provides output to the output device 10.

Figure 2:
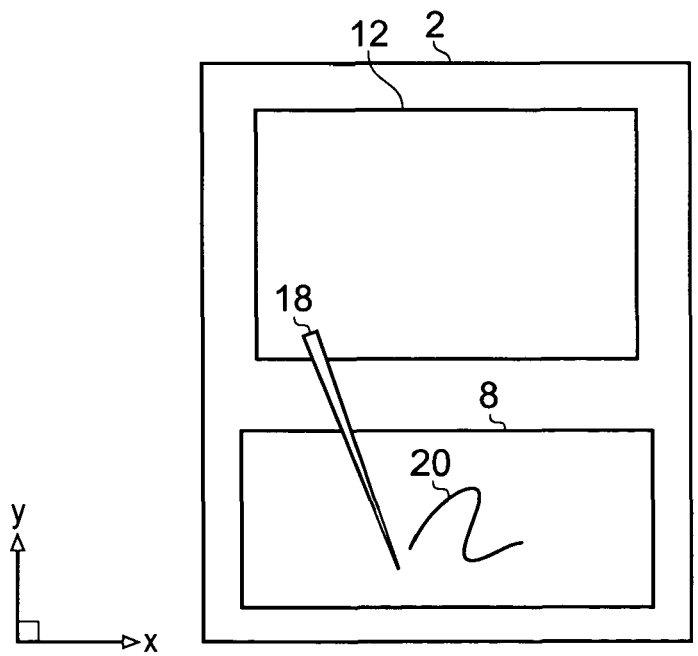
FIG. 2 illustrates an electronic device 2 having a touch sensitive screen.

The gesture input device 8 is for detecting gestures. In one embodiment, as illustrated in FIG. 2, the gesture input device 8 is a touch sensitive screen and a separable stylus 18 is used to trace out the gesture 20 on the touch sensitive screen 8. This screen may, for example, provide a virtual keyboard or an area for handwriting recognition. If the screen provides a virtual keyboard a user's finger may be used instead of a stylus. In another embodiment, the gesture input device 8 is capable of detecting a gesture made by the motion of a hand or finger in free space. This may be achieved by, for example, carrying a radio transmitter on the hand or digit and detecting the time of arrival of radio beacons transmitted by the transmitter at three separate spaced radio receivers of the device 2. The time measurements may be used to position the transmitter by and to detect changes in the position of the transmitter. It may also be achieved using a computer mouse, for example, where the gesture drags the mouse over a surface.

The memory 6 stores computer program instructions 7, which when loaded into the processor 4 control the operation of the device 2. The computer program instructions 7 provide the logic and routines that enables the electronic device 2 to perform the method illustrated in FIG. 3. The computer program instructions 7 may arrive at the electronic device 2 via an electromagnetic carrier signal or be copied from a storage device such as a memory device or a record medium such as a CD-ROM or DVD.

The memory 6 also records data 9 corresponding to a gesture as the gesture is performed. This data 9 is used to identify gestures and partial gestures.

The output device 10 includes a display 12. This display may be integrated with the gesture input device 8 as, for example, a touch sensitive display or may be a separate device. Typically the display 12 is capable of composing and displaying a string of alphanumeric characters in response to gestures performed by a user and detected by the gesture input device 8. For example, if the user carries out a gesture associated with the letter 'a', the letter 'a' is displayed on the screen. If the user then carries out a gesture associated with the letter 'g', the letter 'g' is displayed after the letter 'a' on the display 12.

The processor 4 under the control of the computer program instructions provides a detector 14 and a controller 16. The detector 14 detects, within a gesture detected by the gesture input device 8, each one of a sequence of partial gestures that form the gesture. The controller 16 performs the same first command on the detection of each partial gesture by the detector 14. The first command is associated with each partial gesture. The detector 14 and controller 16 operate in real-time so that the first command is performed immediately after the occurrence of a partial gesture.

When the display is displaying a string of alphanumeric characters, the first command deletes the current last character in the string assuming that the input cursor is after the last character. However, if the input cursor is not after the end of the string, the first command deletes the character that precedes the input cursor. The length of the string therefore decreases by one character with the execution of each first command.

A moving point defines a gesture 20. The trajectory of the point during the gesture can be broken into partial gestures. Waypoints 40 are the places on the trajectory that separate the partial gestures. The point may, for example, be traced out by a hand moving in the air or may be where a stylus 18 contacts a touch sensitive screen 8. Contact between the stylus 18 and touch sensitive screen 8 is maintained throughout the gesture and the gesture ends by lifting the stylus 18 from the touch sensitive screen 8.

The gesture 20 illustrated in FIG. 2, can be represented as a displacement s(t) that varies in time. The displacement s(t) has a component x(t) in the +x-direction and a component y(t) in the +y-direction. The gesture 20 may be recorded by recording the values x(t) and y(t) at regular intervals.

Figure 4A:
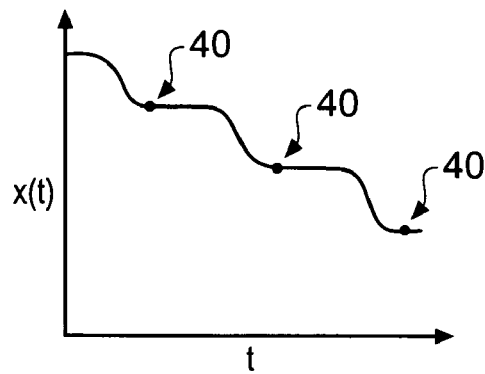
FIGS. 4A and 4B illustrate the displacement in the x-direction and the y-direction caused by a gesture that is comprised of multiple right to left line strokes in the x-direction.
Figure 4B:
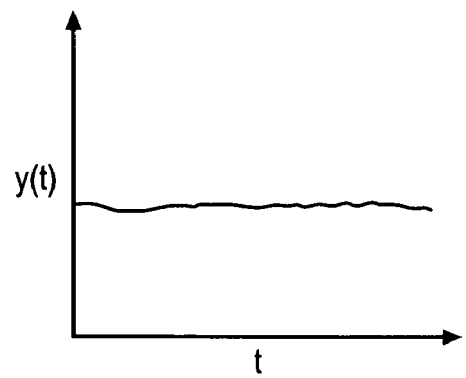

In a first example, illustrated in FIGS. 4A and 4B a gesture 20 consists of only a sequence of consecutive first partial gestures 32 such as repeatedly drawing a line from right to left (−x direction). The FIG. 4A illustrates the variation in x(t) during the gesture and FIG. 4B illustrates the variation in y(t) during the gesture.

In a second example, the gesture 20 consists of different first partial gestures 32 and second partial gestures 34. The gesture 20 may comprise the interleaving of consecutive first partial gestures 32 and second partial gestures 34 i.e. each first partial gesture 32 is followed by a second partial gesture 34 as opposed to a first partial gesture 32 and each second partial gesture 34 is followed by a first partial gesture 32 as opposed to a second partial gesture 34. The first partial gesture 32 and the second partial gesture 34 may be repeated multiple times.

Figure 5A:
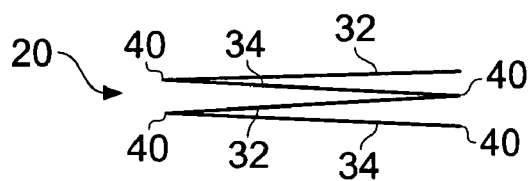
FIG. 5A illustrates an oscillatory gesture that is comprised of left to right and right to left line strokes in the x-direction.

For example, as illustrated in FIG. 5A, the first partial gesture 32 may involve drawing a line from right to left (−x direction) and the second partial gesture 34 may involve drawing a line from left to right (+x direction). The second partial gesture 34 is the reverse of the first partial gesture 32 which makes the gesture 20 an oscillating gesture. The FIG. 5B illustrates the variation in x(t) during the oscillating gesture 20 of FIG. 5A and FIG. 5C illustrates the variation in y(t) during the oscillating gesture 20 of FIG. 5A.

Figure 5B:
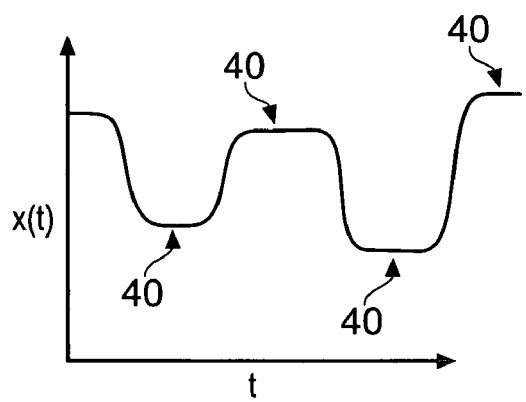
FIGS. 5B and 5C illustrate the displacement in the x-direction and the y-direction caused by the oscillatory gesture illustrated in FIG. 5A.
Figure 5C:
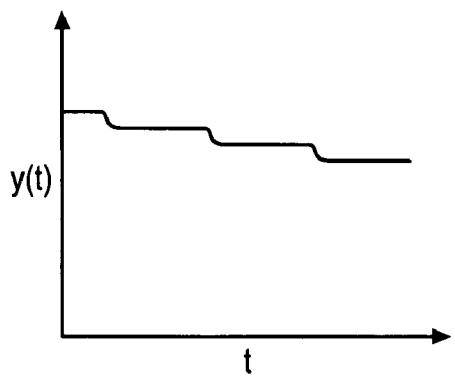

In the example illustrated in FIG. 5B, the first partial gesture involves an acceleration component in the −x direction, followed by a deceleration component in the −x direction falling to zero at the waypoint 40. The second partial gesture involves an acceleration component in the +x direction followed by a deceleration component in the −x direction falling to zero at the waypoint 40.

Figure 3:
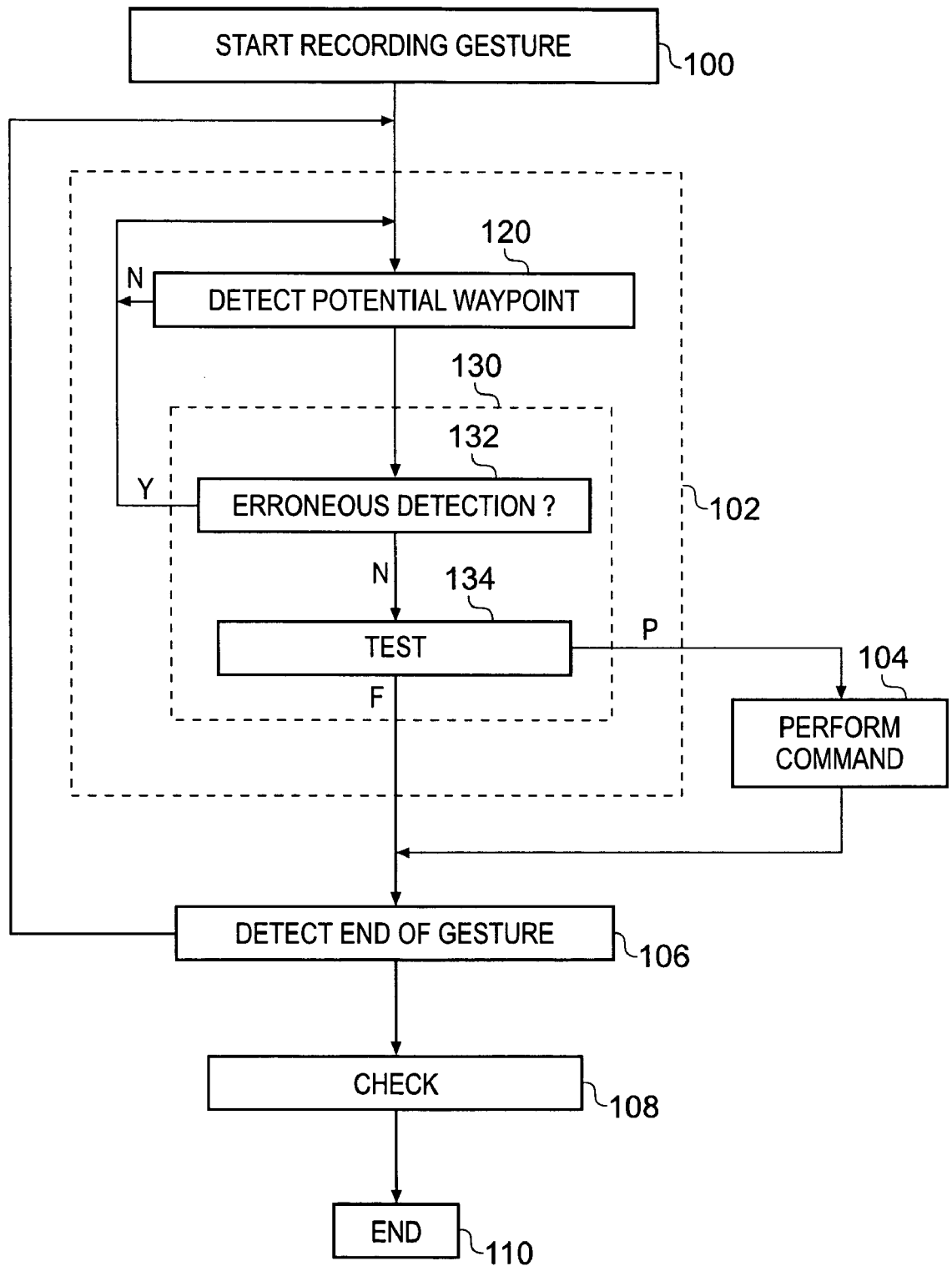
FIG. 3 schematically illustrates a method of controlling the electronic device using gesture as an input.

FIG. 3 schematically illustrates a method of controlling an electronic device 2 using a gesture as an input.

The method starts at step 100, where the memory 6 starts to record data 9 corresponding to a gesture 20 as the gesture is performed. The data may for example be the values of x(t) and y(t) at regular intervals. The data 9 is provided by the gesture input device 8 to the processor 4 which stores the data 9 in memory 6.

Then at step 102, the detector 14 uses the data 9 to detect each one of a sequence of partial gestures that form the performed gesture 20. When a partial gesture is detected at step 102, the method branches to step 104, where the controller 16 performs the first command, and then proceeds to step 106. If a partial gesture is not detected at step 102, the method instead moves directly to step 106. At step 106 a process for detecting the end of a gesture 20 is performed. If the end of a gesture 20 is detected the method moves on to a check step 108. If the end of a gesture 20 is not detected the method returns to step 102. Each partial gesture is detected in real-time and the command is performed immediately in real-time.

The step 102, used to detect each one of a sequence of partial gestures is sub-divided into a first step 120 in which a potential waypoint is detected and a second step 130 in which a test is performed to confirm that the potential waypoint is a waypoint 40 separating partial gestures. If a potential waypoint is not detected at step 120, the method loops back to step 120 until an end of the gesture is detected. If a potential waypoint is detected at step 120, the method proceeds to step 130.

The detector 14 may detect a waypoint by measuring when the change in the magnitude of displacement of the point with time period falls below a threshold. This may be measured as a first or second differential of displacement with time. That is the waypoint may be identified as where the velocity of the point reaches or approaches zero (or reverses direction) or where the acceleration of the point reaches or approaches zero (or reverses direction). In the FIGS. 4A and 5B a waypoint 40 is, for example, where the graph of displacement x(t) becomes flat.

The step 130 is itself sub-divided into two steps. In a first step 132, a process is performed to detect the erroneous identification of potential waypoints. If a potential waypoint has been erroneously identified, the method returns to step 120. If the potential waypoint has not been erroneously identified the method moves onto a second step 134, where the potential waypoint is tested to determine if it is a waypoint. If the test is positive, the first command is performed at step 104. If the test is negative, the method proceeds to step 106.

The step 132 may be used as a filter, for example, to prevent the interpretation of involuntary gestures as partial gestures.

For example, it can be assumed that if a partial gesture is below a certain size it is involuntary. In this example, at step 132, it is determined whether the magnitude of displacement, in the x-direction, of the point since a last waypoint exceeds a threshold. That is, the steps in the displacement x(t) in FIGS. 4A and 5B must be large enough if they are to be recognised as a partial gesture.

If the gesture is a series of lines in the −x direction as described with reference to FIGS. 4A and 4B, then the testing step 134 may, for example, test whether a change in a magnitude of displacement, in the −x direction, of the point since a last waypoint exceeds a change in the magnitude of displacement, in the y direction, of the point since the last waypoint by a predetermined margin. This corresponds to testing that the height of the steps in FIG. 4A being significantly greater than any corresponding steps in FIG. 4B.

If the gesture is an oscillating gesture comprising alternate lines in the −x direction and +x direction as described with reference to FIGS. 5A, 5B and 5C, then the testing step 134 may, for example, test whether a net displacement of the point in the −x direction between the last waypoint and the potential waypoint is in an opposite sense to the net displacement of the point in −x direction between the waypoint preceding the last waypoint and the last waypoint. This corresponds to testing that the value x(t) oscillates up and down.

It should be appreciated that there are many other ways of detecting partial gestures.

At the step 106, the end of a gesture 20 is detected. This may be achieved, for example, by detecting a special partial gesture that signifies the end or, for example, detecting that the stylus 18 has broken contact with the touch screen 8.

At the check step 108, the controller 16 determines whether the recorded gesture 20 corresponds to one of a plurality of predetermined gesture inputs. If the recorded gesture corresponds to a predetermined gesture input, the controller 16 undoes the sequence of first commands performed as a consequence of the gesture and performs a second command associated with the predetermined gesture input.

As an example of how the check step 108 works, let a circle be a command to insert a standard alphanumeric character string at the end of a displayed string. The circle if traced in an anti-clockwise direction may be interpreted as a right to left line followed by a left to right line. If these correspond to predetermined partial gestures, then the detection of the right to left line would result in the deletion of the last character of the displayed string and the detection of the left to right line would result in the deletion of the penultimate character of the displayed string i.e. the current last character. However, on finishing the gesture, it would be recognised as a circle and the penultimate and last characters would be replaced and the standard string added.

Although embodiments of the present invention have been described in the preceding paragraphs with reference to various examples, it should be appreciated that modifications to the examples given can be made without departing from the scope of the invention as claimed.

For example, a gesture may be used to perform a number of different functions depending on context in addition or as alternatives to the delete function previously described.

For example, in a menu application, the 'scroll up' function is performed on detecting each first partial gesture. A 'scroll-up' function displays a menu item that precedes the current menu item. In this example, the gesture may be a series of lines in the +y direction with each line being a first partial gesture. The 'scroll-down' function is performed on detecting each second partial gesture. A 'scroll-down' function displays a menu item that follows the current menu item. In this example, the gesture may be a series of lines in the −y direction with each line being a second partial gesture.

For example, in a menu application, multiple 'scroll-up' functions are performed by detecting each partial gesture of an oscillating gesture that is made up of alternating first and second partial gestures, where the first partial gesture is a line in the +y direction and the second partial gesture is a line in the −y direction, and that starts with a first partial gesture i.e. a line in the +y direction. Multiple 'scroll-down' functions are performed on detecting the same oscillating gesture except that it starts with a second partial gesture i.e. a line in the −y direction.

For example, in a browser application, the 'back' function is performed on detecting each first partial gesture. A 'back' function displays a prior page to that currently viewed in a sequence of previously viewed pages. In this example, the gesture may be a series of lines in the −x direction with each line being a first partial gesture. The 'forward' function is performed on detecting each second partial gesture. A 'forward' function displays a next page to that currently viewed in a sequence of previously viewed pages. In this example, the gesture may be a series of lines in the +x direction with each line being a second partial gesture.

For example, in a browser application, multiple 'back' functions are performed by detecting each partial gesture of an oscillating gesture that is made up of alternating first and second partial gestures, where the first partial gesture is a line in the −x direction and the second partial gesture is a line in the +x direction, and that starts with a first partial gesture i.e. a line in the −x direction. Multiple 'forward' functions are performed on detecting the same oscillating gesture except that it starts with a second partial gesture i.e. a line in the +x direction.

For example, in a document reading application, the 'back' function is performed on detecting each first partial gesture. A 'back' function displays a prior page to that currently viewed. In this example, the gesture may be a series of lines in the −x direction with each line being a first partial gesture. The 'forward' function is performed on detecting each second partial gesture. A 'forward' function displays a next page to that currently viewed. In this example, the gesture may be a series of lines in the +x direction with each line being a second partial gesture.

For example, in a document reading application, multiple 'back' functions are performed by detecting each partial gesture of an oscillating gesture that is made up of alternating first and second partial gestures, where the first partial gesture is a line in the −x direction and the second partial gesture is a line in the +x direction, and that starts with a first partial gesture i.e. a line in the −x direction. Multiple 'forward' functions are performed by detecting each partial gesture of the same oscillating gesture except that it starts with a second partial gesture i.e. a line in the +x direction.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising:
   recording with a gesture input device a gesture, wherein the gesture is defined by a moving point having a trajectory broken into partial gestures which are contiguous touch gestures, and where waypoints separate the partial gestures and the trajectory of the moving point is uninterrupted from a starting point to an end point and detecting, within the gesture, each one of a sequence of the partial gestures that form the gesture; and performing a same first command on detecting each partial gesture, where the gesture input device comprises part of an electronic device that comprises a display, and where the first command is at least one of a command to perform a display scroll up function or scroll down function, and a command to perform a display page back function or page forward function, wherein the method further comprises: a) detecting a potential waypoint separating partial gestures; b) testing to confirm that the potential waypoint is a waypoint separating partial gestures; c) if the test is positive, performing the first command; and repeating step a), b) and c) until the gesture ends.

2. The method as claimed in claim 1, wherein each partial gesture is detected in real-time and the first command is performed immediately in real-time.

3. The method as claimed in claim 1, wherein the gesture comprises repetition of a first partial gesture.

4. The method as claimed in claim 3, wherein the first partial gesture involves an acceleration component in a first direction, followed by a deceleration component in the first direction and the second partial gesture involves an acceleration component in a second direction, opposite to first direction, followed by a deceleration component in the second direction.

5. The method as claimed in claim 1, wherein the gesture comprises the interleaving of a first partial gesture and a second partial gesture.

6. The method as claimed in claim 5, wherein the second partial gesture is the reverse of the first partial gesture.

7. The method as claimed in claim 5, wherein the first partial gesture involves drawing a line from right to left and the second partial gesture involves drawing a line from left to right.

8. The method as claimed in claim 1, wherein the moving point defines the gesture and step a) comprises measuring when the magnitude of displacement of the point over a time period falls below a threshold.

9. The method as claimed in claim 1, wherein the moving point defines the gesture and step b) comprises testing whether a change in a magnitude of displacement, in a first direction, of the point since a last waypoint exceeds a change in the magnitude of displacement, in a third direction, of the point since the last waypoint by a margin, wherein the first and third directions are orthogonal.

10. The method as claimed in claim 1, wherein the moving point defines the gesture and step b) comprises testing whether a magnitude of displacement, in a first direction, of the point since a last waypoint exceeds a threshold.

11. The method as claimed in claim 10, wherein the point is where a stylus contacts a touch sensitive screen, where the contact between the stylus and screen is maintained throughout the gesture and the gesture ends by lifting the stylus from the touch sensitive screen.

12. The method as claimed in claim 1, wherein the moving point defines the gesture and step b) comprises testing whether a net displacement of the point in a first direction between the last waypoint and the potential waypoint is in an opposite sense to the net displacement of the point in the first direction between the waypoint preceding the last waypoint and the last waypoint.

13. The method as claimed in claim 12, wherein the point is where a stylus contacts a touch sensitive screen, where the contact between the stylus and screen is maintained throughout the gesture and the gesture ends by lifting the stylus from the touch sensitive screen.

14. The method as in claim 1 wherein the same command deletes a character in a string of displayed characters.

15. The method as claimed in claim 1, further comprising:
   i) determining whether the recorded gesture corresponds to a predetermined gesture input;
   ii) if the recorded gesture corresponds to the predetermined gesture input undoing the sequence of first commands performed as a consequence of the gesture;
   iii) performing a second command associated with the predetermined gesture input.

16. A storage device embodying a computer program comprising program instructions configured to cause a computer to perform the method of claim 1.

17. The method as claimed in claim 1, wherein the moving point is where a separable object contacts a touch sensitive screen of the gesture input device and contact between the object and the touch sensitive screen is maintained throughout the gesture, with the gesture ending by lifting the object from the touch sensitive screen.

18. The method as claimed in claim 1, wherein the moving point is traced out by an object moving in the air relative to a touch sensitive screen.

19. An apparatus comprising:
   at least one processor,
   and at least one memory including computer program code,
   the at least one memory and the computer code configured to, with the at least one processor,
   cause the apparatus at least to:
      record with a gesture input device a gesture, wherein the gesture is defined by a moving point having a trajectory broken into partial gestures which are contiguous touch gestures, and where waypoints separate the partial gestures and the trajectory of the moving point is configured to be uninterrupted from a starting point to an end point;
      detect, within the gesture, each one of a sequence of partial gestures that form the gesture; and
      perform a same first command in response to each detected partial gesture, where the first command is at least one of a command to perform a scroll up function or scroll down function, and a command to perform a page back function or page forward function, the apparatus comprising a detector configured to detect potential waypoints separating partial gestures and to test whether potential waypoints are waypoints separating partial gestures;
   and a controller configured, if a test is positive, to perform the first command.

20. The apparatus as claimed in claim 19, comprising a detector and a controller which operate in real-time so that the first command is performed immediately after the occurrence of a partial gesture.

21. The apparatus as claimed in claim 19, wherein the detector is configured to detect the moving point, to measure the magnitude of displacement of the moving point over time and to detect when the measured magnitude of displacement of the point over a time period falls below a threshold.

22. The apparatus as claimed in claim 21, comprising a separable stylus, wherein the gesture input device is a touch sensitive screen and the point is where the stylus contacts the touch sensitive screen.

23. The apparatus as claimed in claim 19, wherein the detector is configured to detect the moving point, to measure the magnitude of displacement of the moving point over time and to test whether a change in a magnitude of displacement, in a first direction, of the point since a last waypoint exceeds a change in the magnitude of displacement, in a third direction, of the moving point since the last waypoint by a margin, wherein the first and third directions are orthogonal.

24. The apparatus as claimed in claim 19, wherein the detector is configured to detect the moving point, to measure the magnitude of displacement of the moving point over time and to test whether a magnitude of displacement, in a first direction, of the moving point since a last waypoint exceeds a threshold.

25. The apparatus as claimed in claim 19, comprising a detector configured to detect the moving point, to measure the magnitude of displacement of the moving point over time and to test whether a net displacement of the point in a first direction between the last waypoint and the potential waypoint is in an opposite sense to the net displacement of the moving point in the first direction between the waypoint preceding the last waypoint and the last waypoint.

26. The apparatus as claimed in claim 19, further comprising a display where said display is configured to display a string of characters, wherein each first command deletes the last character in a string of displayed characters.

27. The apparatus as claimed in claim 19, comprising a controller configured to determine whether the recorded gesture corresponds to a predetermined gesture input, to undo the sequence of first commands performed as a consequence of the gesture, if the recorded gesture corresponds to the predetermined gesture input, and to perform a second command associated with the predetermined gesture input.

28. The apparatus as claimed in claim 19, comprising a controller provided by a programmed processor.

29. A storage device embodying a computer program comprising program instructions which when loaded into a processor result in performance of operations that comprise:
 detecting each one of a sequence of partial gestures that form a gesture, wherein the gesture is defined by a moving point having a trajectory broken into partial gestures which are contiguous touch gestures, and where waypoints separate the partial gestures and the trajectory of the moving point is configured to be uninterrupted from a starting point to an end point;
 performing a same first command on detecting each partial gesture, where the first command is at least one of a command to perform a scroll up function or scroll down function, and a command to perform a page back function or page forward function; and
 a) detecting a potential waypoint separating partial gestures; b) testing to confirm that the potential waypoint is a waypoint separating partial gestures; c) if the test is positive, performing the first command; and repeating step a), b) and c) until the gesture ends.

* * * * *